United States Patent
Kindaichi et al.

(10) Patent No.: US 11,132,905 B2
(45) Date of Patent: Sep. 28, 2021

(54) AIRCRAFT POSITION MEASUREMENT SYSTEM, AIRCRAFT POSITION MEASUREMENT METHOD, AND AIRCRAFT

(71) Applicant: SUBARU CORPORATION, Tokyo (JP)

(72) Inventors: Kumiko Kindaichi, Tokyo (JP); Yutaka Sasaki, Tokyo (JP); Toshiyuki Narahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 58 days.

(21) Appl. No.: 16/589,629

(22) Filed: Oct. 1, 2019

(65) Prior Publication Data

US 2020/0126430 A1 Apr. 23, 2020

(30) Foreign Application Priority Data

Oct. 17, 2018 (JP) .............................. JP2018-195483

(51) Int. Cl.
*G08G 5/00* (2006.01)
*G01S 19/45* (2010.01)
(Continued)

(52) U.S. Cl.
CPC ......... *G08G 5/0008* (2013.01); *G01C 21/165* (2013.01); *G01S 19/13* (2013.01); *G01S 19/45* (2013.01); *G05D 1/0077* (2013.01)

(58) Field of Classification Search
CPC ....... G08G 5/0008; G01S 19/45; G01S 19/13; G01S 17/66; G01S 13/66; G01S 19/215;
(Continued)

(56) References Cited

U.S. PATENT DOCUMENTS 4,359,733 A * 11/1982 O'Neill ..................... G01S 5/14
342/357.31
6,275,677 B1 * 8/2001 Tandler .................. H04B 7/195
455/12.1
(Continued)

FOREIGN PATENT DOCUMENTS

JP 2015-31699 A 2/2015

*Primary Examiner* — Thomas Ingram
(74) *Attorney, Agent, or Firm* — Troutman Pepper Hamilton Sanders LLP (57) ABSTRACT

An aircraft position measurement system is provided for an aircraft configured to use an artificial satellite configured to fly in a known orbit. The aircraft position measurement system includes a reflector, a distance-angle measuring member, a satellite position obtainer, and an aircraft position calculator. The reflector configured to be mounted on the artificial satellite and reflect an electromagnetic wave in a direction in which the electromagnetic wave arrives. The distance-angle measuring member is configured to be mounted on the aircraft and emit an electromagnetic wave and measure a bearing and a distance to the artificial satellite when seen from the aircraft. The satellite position obtainer is configured to obtain an absolute position of the artificial satellite. The aircraft position calculator is configured to calculate a position of the aircraft based on the absolute position of the artificial satellite and the bearing and the distance to the artificial satellite.

13 Claims, 5 Drawing Sheets

(51) Int. Cl.
*G05D 1/00* (2006.01)
*G01S 19/13* (2010.01)
*G01C 21/16* (2006.01)

(58) Field of Classification Search
CPC ..... G01S 19/49; G01S 19/485; G05D 1/0077; G01C 21/165; G01C 15/002
See application file for complete search history.

(56) References Cited

U.S. PATENT DOCUMENTS

| | | | |
|---|---|---|---|
| 9,083,425 B1* | 7/2015 | Frolov | G05D 1/104 |
| 9,250,312 B1* | 2/2016 | Knibbe | G01S 5/16 |
| 10,605,603 B2* | 3/2020 | Waldron | H04N 5/332 |
| 10,707,961 B2* | 7/2020 | Turner | H04B 7/195 |
| 2014/0195150 A1* | 7/2014 | Rios | G01C 21/00 |
| | | | 701/469 |
| 2015/0046017 A1* | 2/2015 | Torti | G01S 19/21 |
| | | | 701/25 |
| 2019/0028197 A1* | 1/2019 | Turner | H04B 10/118 |

* cited by examiner

AIRCRAFT POSITION MEASUREMENT SYSTEM, AIRCRAFT POSITION MEASUREMENT METHOD, AND AIRCRAFT

CROSS-REFERENCE TO RELATED APPLICATIONS

The present application claims priority from Japanese Patent Application No. 2018-195483 filed on Oct. 17, 2018, the entire contents of which are hereby incorporated by reference.

BACKGROUND

The disclosure relates to a technique for measuring the position of an aircraft.

SUMMARY

An aspect of the disclosure provides an aircraft position measurement system for an aircraft configured to use an artificial satellite configured to fly in a known orbit. The system includes a reflector, a distance-angle measuring member, a satellite position obtainer, and an aircraft position calculator. The reflector is configured to be mounted on the artificial satellite and reflect an electromagnetic wave in a direction in which the electromagnetic wave arrives. The distance-angle measuring member is configured to be mounted on the aircraft and emit an electromagnetic wave and measure a bearing and a distance to the artificial satellite when seen from the aircraft; a satellite position obtainer configured to obtain an absolute position of the artificial satellite. The aircraft position calculator is configured to calculate a position of the aircraft on a basis of the absolute position of the artificial satellite and the bearing and the distance to the artificial satellite.

An aspect of the disclosure provides an aircraft position measurement method for measuring a position of an aircraft by using an artificial satellite configured to fly in a known orbit. A reflector is to be mounted on the artificial satellite. The reflector is configured to reflect an electromagnetic wave in a direction in which the electromagnetic wave arrives is mounted. A controller of the aircraft is configured to perform the method. The method includes emitting an electromagnetic wave from the aircraft and measuring a bearing and a distance to the artificial satellite when seen from the aircraft. The method includes obtaining an absolute position of the artificial satellite. The method includes calculating the position of the aircraft on a basis of the absolute position of the artificial satellite and the bearing and distance to the artificial satellite.

An aspect of the disclosure provides an aircraft. The aircraft includes a satellite position obtainer, a distance-angle measuring member, an aircraft position calculator. The satellite position obtainer is configured to obtain an absolute position of an artificial satellite. The distance-angle measuring member is configured to emit an electromagnetic wave and measure a bearing and a distance to the artificial satellite when seen from the aircraft. The aircraft position calculator is configured to calculate a position of the aircraft on a basis of the absolute position of the artificial satellite and the bearing and the distance to the artificial satellite.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

In the current operations of aircrafts, own-position measurement using the global positioning system (GPS) is widely performed.

However, GPS signals from GPS satellites at an altitude of about 20000 km are weak, may be easily jammed, and are likely to be spoofed by a false GPS signal. In such a case, an aircraft may be unable to grasp its own position and may stray or crash in the worst case.

As an own-position measurement technique without using external signals, such as GPS signals, celestial navigation is available.

In celestial navigation described in, for example, Japanese Unexamined Patent Application Publication No. 2015-31699, data collected by using a camera and so on is compared with position information stored in a celestial database to calculate the position of an unmanned aerial vehicle.

However, in the above-described celestial navigation, a process for checking an excessively large amount of data is to be performed, which may lead to a heavy computational load and a long processing time. Further, it might not be possible to use the celestial navigation in daytime position measurement except when the sun and the moon are used.

It is desirable to satisfactorily measure the position of an aircraft without depending on external signals.

First Embodiment

Configuration of Position Measurement System

First, the configuration of a position measurement system 100 in a first embodiment of the disclosure will be described.

Figure 1:
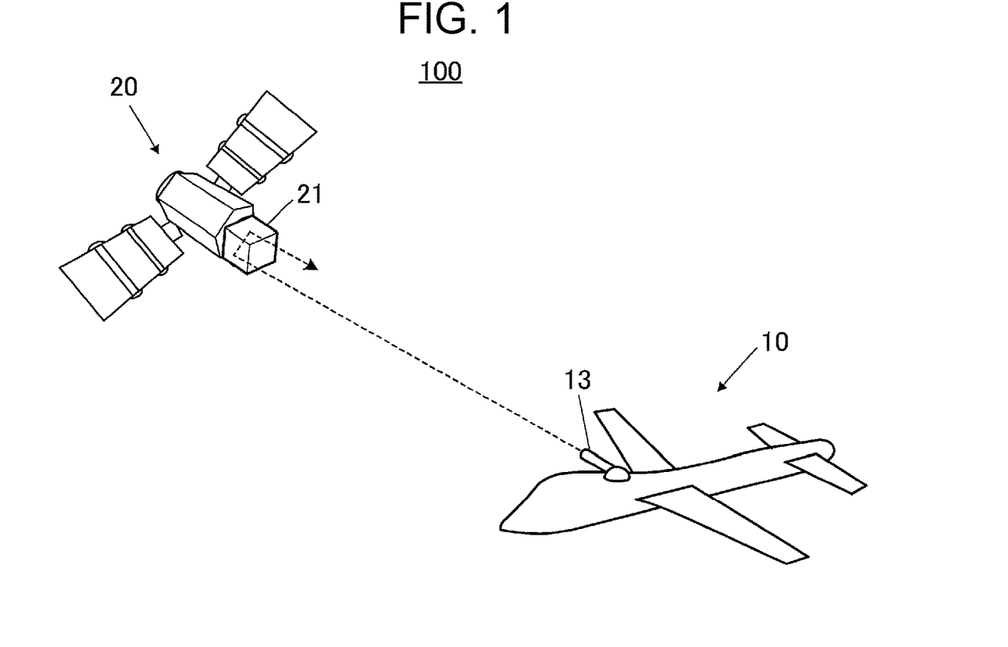
FIG. 1 is a schematic diagram of a position measurement system in a first embodiment.
Figure 2:
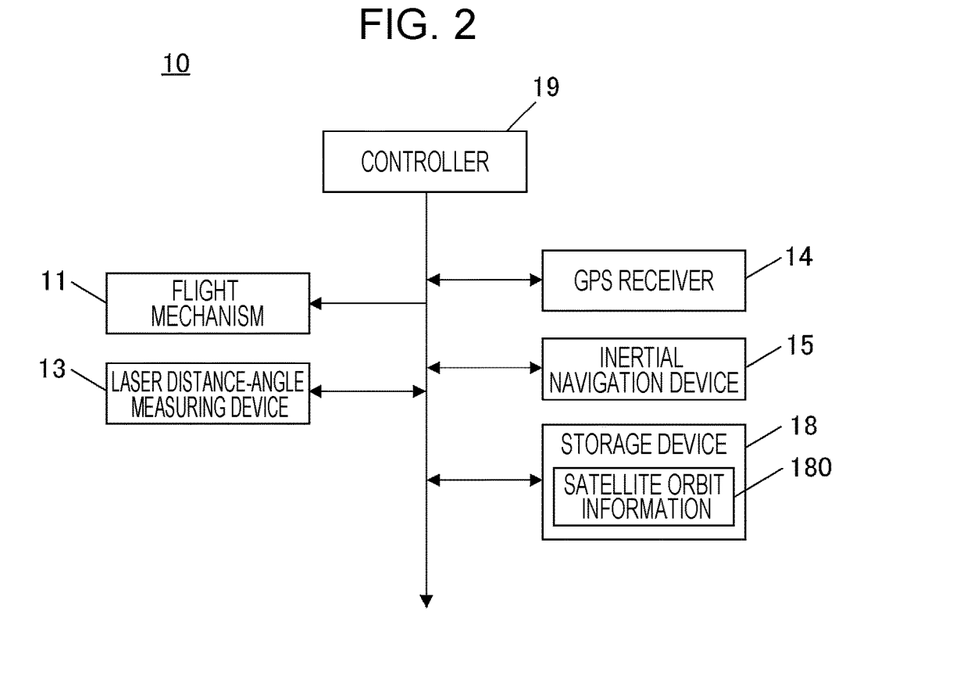
FIG. 2 is a block diagram schematically illustrating the functional configuration of an unmanned aerial vehicle in the first embodiment.

FIG. 1 is a schematic diagram of the position measurement system 100, and FIG. 2 is a block diagram schematically illustrating the functional configuration of an unmanned aerial vehicle 10 in the position measurement system 100.

As illustrated in FIG. 1, the position measurement system 100 is constituted by the unmanned aerial vehicle (unmanned aircraft) 10 and an artificial satellite 20 that flies in a known orbit, and allows the unmanned aerial vehicle 10 to obtain information about its own position without depending on external signals.

As illustrated in FIG. 2, the unmanned aerial vehicle 10 includes a laser distance-angle measuring device 13, a GPS receiver 14, an inertial navigation device 15, a storage device 18, and a controller 19 as well as a flight mechanism 11 for making the unmanned aerial vehicle 10 fly.

The laser distance-angle measuring device 13 includes a laser emitter and a photoreceptor. Laser light emitted from the laser emitter and reflected by a measurement target is received by the photoreceptor so that the distance and bearing (direction) to the measurement target can be measured. The laser emitter of the laser distance-angle measuring device 13 is movable, which enables a scan of laser light within a predetermined angle range.

The GPS receiver 14 receives a GPS signal that includes information about the position (present position) of the unmanned aerial vehicle 10 from a GPS satellite. The GPS receiver 14 outputs the reception state of the GPS signal and the information about the position of the unmanned aerial vehicle 10 obtained from the GPS signal to the controller 19.

A satellite position-measurement system other than the GPS may be used. In this case, the GPS receiver 14 is to be replaced by a device compatible with the system, as a matter of course.

The inertial navigation device 15 is capable of measuring the position, speed, and so on of the unmanned aerial vehicle 10 without depending on external radio waves by using a gyroscope and an accelerometer. The inertial navigation device 15 outputs information about the measured position (hereinafter referred to as "inertial-navigation-based position) of the unmanned aerial vehicle 10 to the controller 19. To reduce accumulation of errors, the inertial navigation device 15 makes a correction based on the position obtained from the GPS signal and outputs the inertial-navigation-based position. In a case where position measurement described below is performed, the correction based on the GPS signal need not be performed.

The storage device 18 is a memory that stores a program and data for implementing various functions of the unmanned aerial vehicle 10 and also functions as a work area. In this embodiment, the storage device 18 stores in advance satellite orbit information 180.

The satellite orbit information 180 is information indicating the orbit of the artificial satellite 20. On the basis of this information, the position (absolute position) of the artificial satellite 20 at any time can be obtained.

The controller 19 centrally controls the components of the unmanned aerial vehicle 10. Specifically, the controller 19 controls driving of the flight mechanism 11 to control the flight of the unmanned aerial vehicle 10, and controls operations of the laser distance-angle measuring device 13 and so on.

On the artificial satellite 20, a reflector 21 is mounted, as illustrated in FIG. 1.

In this embodiment, the reflector 21 is a corner cube reflector and reflects laser light emitted from the unmanned aerial vehicle 10 in the direction in which the laser light arrives.

Position Measurement Method

Next, a position measurement method for the unmanned aerial vehicle 10 to obtain its own position during flight in the position measurement system 100 of the first embodiment will be described.

Figure 3:
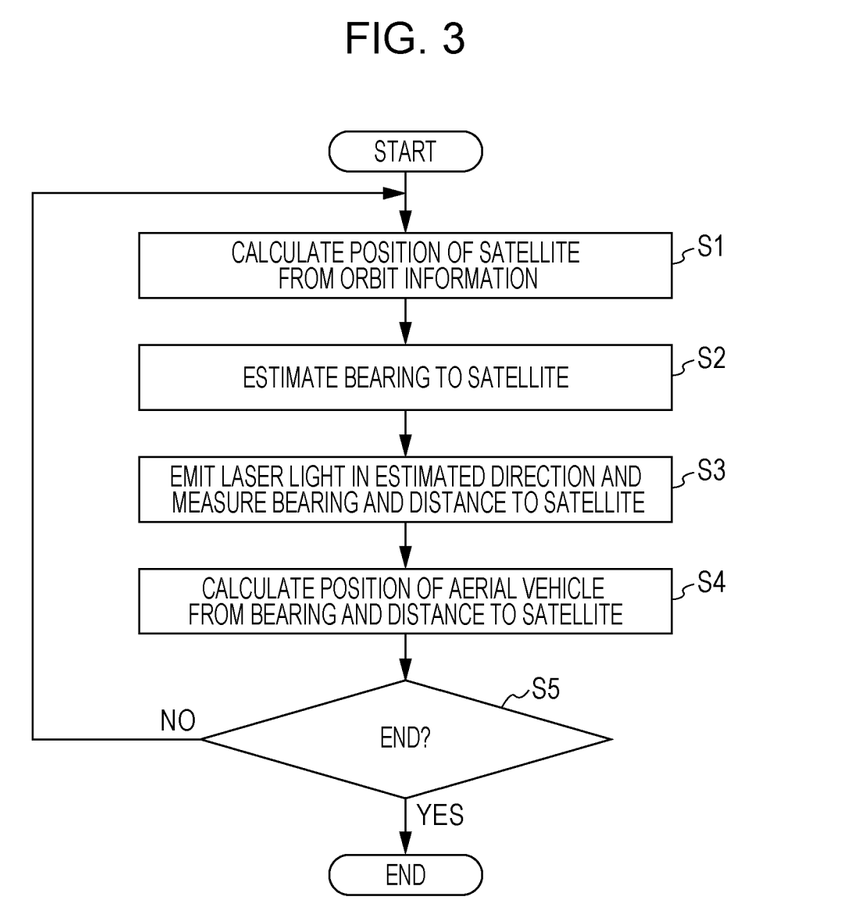
FIG. 3 is a flowchart illustrating the flow of a position measurement method performed by the position measurement system in the first embodiment.

FIG. 3 is a flowchart illustrating the flow of this position measurement method.

In this embodiment, position measurement by the position measurement system 100 is performed in a case where the reliability of the position information included in the GPS signal is determined to be low because the GPS receiver 14 suffers from, for example, jamming or spoofing by a false signal. Therefore, in this case, the reliability and accuracy of the inertial-navigation-based position measured by the inertial navigation device 15 are low.

In this position measurement, first, the controller 19 calculates the position of the artificial satellite 20 on the basis of the satellite orbit information 180 (step S1), as illustrated in FIG. 3. Here, the satellite orbit information 180 is used to calculate the absolute position (coordinates) of the artificial satellite 20. Time information used in this calculation may be obtained from the GPS signal or may be obtained by using another time obtaining method.

Next, the controller 19 estimates the bearing to the artificial satellite 20 when seen from the unmanned aerial vehicle 10 on the basis of the absolute position of the artificial satellite 20 calculated in step S1 and the inertial-navigation-based position measured by the inertial navigation device 15 (step S2). As described above, the accuracy of the inertial-navigation-based position is low at this point, and it is anticipated that the bearing estimated here includes an error.

Next, the controller 19 controls the laser distance-angle measuring device 13 to measure the bearing and distance to the artificial satellite 20 on the basis of the bearing to the artificial satellite 20 estimated in step S2 (step S3).

More specifically, the controller 19 controls the laser emitter of the laser distance-angle measuring device 13 to scan laser light over a predetermined range including the estimated bearing to the artificial satellite 20. The laser light reflected by the reflector 21 of the artificial satellite 20 is received by the photoreceptor of the laser distance-angle measuring device 13 to thereby obtain the relative bearing and distance to the artificial satellite 20 when seen from the unmanned aerial vehicle 10.

The range over which the laser light is scanned may be determined on the basis of an anticipated error in the inertial-navigation-based position or may be gradually broadened in a case where reflected light is not obtained to perform a re-scan.

Next, the controller 19 calculates the position of the unmanned aerial vehicle 10 on the basis of the absolute position of the artificial satellite 20 calculated in step S1 and the bearing and distance obtained in step S3 (step S4).

Specifically, the controller 19 calculates the position of the unmanned aerial vehicle 10, the position being a position indicated by the coordinates of an inverse vector for the bearing and distance obtained in step S3, from the absolute position of the artificial satellite 20 calculated in step S1. The calculated position is used to correct the inertial-navigation-based position to be output from the inertial navigation device 15.

Accordingly, even in a case where the reliability of own-position measurement performed by the inertial navigation device 15 is compromised because, for example, the GPS receiver 14 suffers from jamming or spoofing by a false signal, the position of the unmanned aerial vehicle 10 can be satisfactorily measured. Specifically, the position can be satisfactorily measured during flight at a high altitude at which almost no clouds that block laser light are present (for example, at an altitude of 15 km (50000 ft.) or higher, which is an altitude higher than an altitude at which high clouds gather).

Next, the controller 19 determines whether to end the position measurement (step S5). In a case where it is determined that the position measurement is not to be ended (No in step S5), the flow returns to step S1 described above.

On the other hand, in a case where it is determined that the position measurement is to be ended because, for example, the unmanned aerial vehicle 10 arrives at the destination (Yes in step S5), the controller 19 ends the position measurement.

As described above, according to the first embodiment, laser light emitted from the laser distance-angle measuring device 13 on the unmanned aerial vehicle 10 is reflected by the reflector 21 of the artificial satellite 20 in the direction in which the laser light arrives so that the bearing and distance to the artificial satellite 20 when seen from the unmanned aerial vehicle 10 are measured. On the basis of the measured bearing and distance to the artificial satellite 20 and the absolute position of the artificial satellite 20, the position of the unmanned aerial vehicle 10 is calculated.

Accordingly, unlike in the existing celestial navigation that involves a heavy computational load and limited daytime use, the position of the unmanned aerial vehicle 10 can be satisfactorily measured without depending on external signals. As a consequence, even in the case where the GPS receiver 14 suffers from jamming or spoofing, own-position measurement can be performed with a higher accuracy than in a case where only the inertial navigation device 15 is used.

Further, the bearing to the artificial satellite 20 when seen from the unmanned aerial vehicle 10 is estimated on the basis of the inertial-navigation-based position calculated by the inertial navigation device 15 of the unmanned aerial vehicle 10 and the absolute position of the artificial satellite 20, and laser light for measurement is emitted from the laser distance-angle measuring device 13 toward a predetermined range including the estimated bearing.

Therefore, the bearing and distance to the artificial satellite 20 can be efficiently measured while the range to which laser light is emitted from the laser distance-angle measuring device 13 is limited.

Further, the laser distance-angle measuring device 13 on the unmanned aerial vehicle 10 uses laser light having high directivity, which can reduce the likelihood of interference.

Further, the unmanned aerial vehicle 10 flies at a high altitude at which almost no clouds are present. Therefore, laser light (an electromagnetic wave) emitted from the laser distance-angle measuring device 13 on the aerial vehicle toward the artificial satellite 20 is not blocked by clouds, and the position of the unmanned aerial vehicle 10 can be satisfactorily measured.

Second Embodiment

Configuration of Position Measurement System

Next, the configuration of a position measurement system 200 in a second embodiment of the disclosure will be described. The position measurement system 200 in the second embodiment is different from the position measurement system 100 in the first embodiment described above in that the position of an artificial satellite is obtained without using an inertial-navigation-based position. Components the same as those in the first embodiment described above are assigned the same reference numerals, and descriptions thereof will be omitted.

Figure 4:
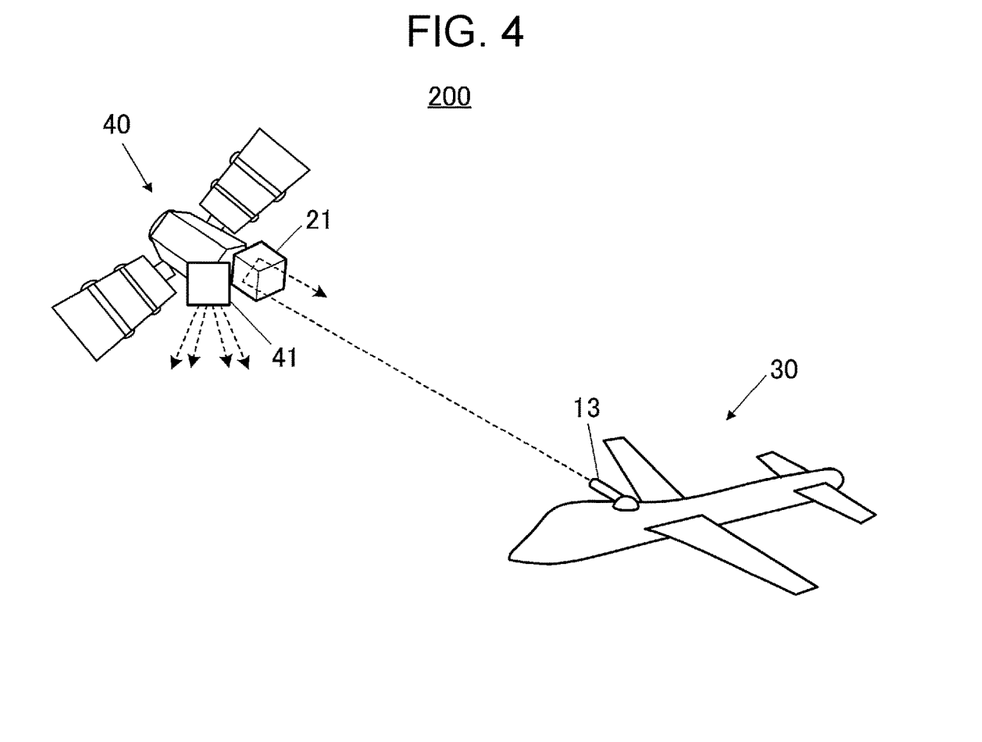
FIG. 4 is a schematic diagram of a position measurement system in a second embodiment.
Figure 5:
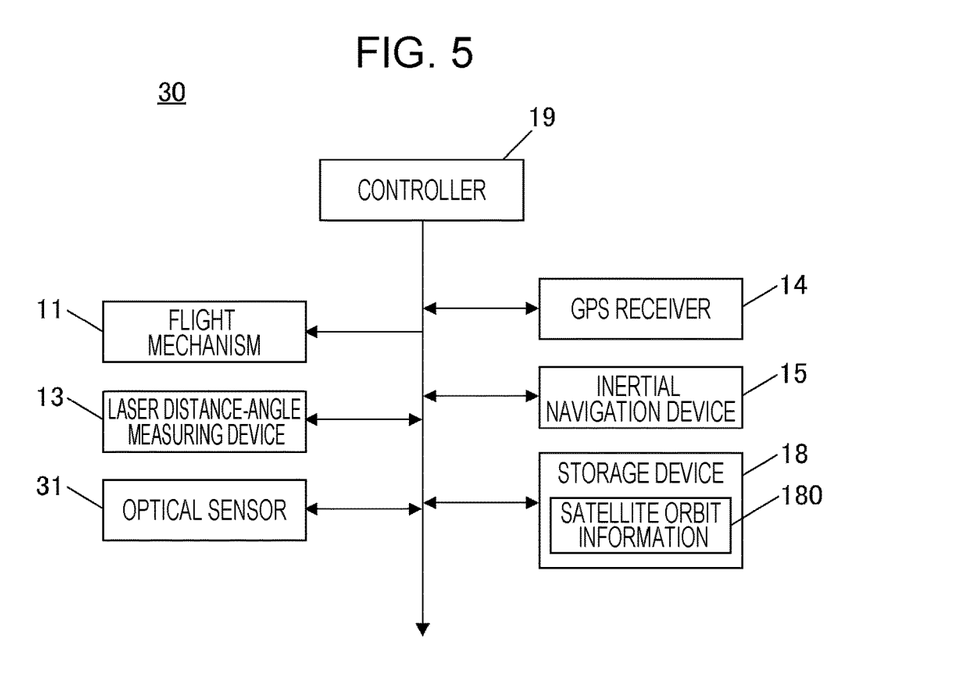
FIG. 5 is a block diagram schematically illustrating the functional configuration of an unmanned aerial vehicle in the second embodiment.

FIG. 4 is a schematic diagram of the position measurement system 200, and FIG. 5 is a block diagram schematically illustrating the functional configuration of an unmanned aerial vehicle 30 in the position measurement system 200.

As illustrated in FIG. 4, the position measurement system 200 is constituted by the unmanned aerial vehicle (unmanned aircraft) 30 and an artificial satellite 40 that flies in a known orbit.

As illustrated in FIG. 5, the unmanned aerial vehicle 30 includes the flight mechanism 11, the laser distance-angle measuring device 13, the GPS receiver 14, the inertial navigation device 15, the storage device 18, and the controller 19 as in the unmanned aerial vehicle 10 in the first embodiment described above and further includes an optical sensor 31. It is assumed that the satellite orbit information 180 stored in the storage device 18 includes orbit information about the artificial satellite 40 in this embodiment.

The optical sensor 31 is an image capturing device capable of obtaining image information about the outside of the aerial vehicle and captures scattered light reflected by a scattering plate 41 of the artificial satellite 40. The optical sensor 31 is provided such that the orientation thereof can be changed.

The artificial satellite 40 includes the reflector 21 similar to that of the first embodiment described above and further includes the scattering plate 41, as illustrated in FIG. 4.

The scattering plate 41 is a reflective plate for scattering light.

Position Measurement Method

Next, a position measurement method for the unmanned aerial vehicle 30 to obtain its own position during flight in the position measurement system 200 of the second embodiment will be described.

Figure 6:
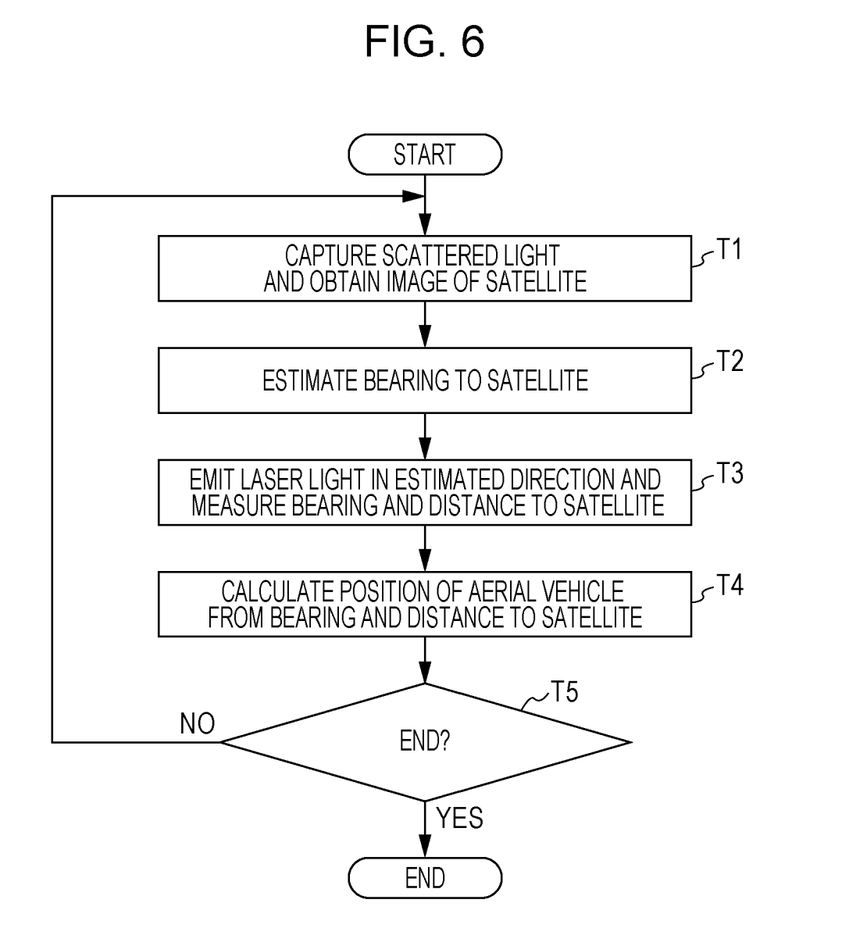
FIG. 6 is a flowchart illustrating the flow of a position measurement method performed by the position measurement system in the second embodiment.

FIG. 6 is a flowchart illustrating the flow of this position measurement method.

As in the first embodiment described above, position measurement by the position measurement system 200 is performed in the case where the reliability of the position information included in the GPS signal is determined to be low because the GPS receiver 14 suffers from, for example, jamming or spoofing by a false signal, and the reliability and accuracy of the inertial-navigation-based position measured by the inertial navigation device 15 are determined to be low accordingly.

In this position measurement, first, the controller 19 obtains an image of the artificial satellite 40 captured by the optical sensor 31 (step T1), as illustrated in FIG. 6.

More specifically, the controller 19 controls the optical sensor 31 to capture sunlight reflected by the scattering plate 41 of the artificial satellite 40 to obtain an image of the artificial satellite 40. The sunlight reflected by the scattering plate 41 is scattered in a wide range, and therefore, the artificial satellite 40 can be grasped from a position in the wide range.

Next, the controller 19 estimates the bearing to the artificial satellite 40 on the basis of the image obtained in step T1 (step T2).

Specifically, the controller 19 estimates the bearing to the artificial satellite 40 when seen from the unmanned aerial vehicle 30, the bearing being the direction of the scattered light, from the orientation of the optical sensor 31 and the position of the artificial satellite 40 (that is, the scattered light) in the obtained image.

Next, the controller 19 controls the laser distance-angle measuring device 13 to measure the bearing and distance to the artificial satellite 40 on the basis of the bearing to the artificial satellite 40 estimated in step T2 (step T3).

More specifically, the controller 19 controls the laser emitter of the laser distance-angle measuring device 13 to scan laser light over a predetermined range including the estimated bearing to the artificial satellite 40. The laser light reflected by the reflector 21 of the artificial satellite 40 is received by the photoreceptor of the laser distance-angle measuring device 13 to thereby obtain the relative bearing and distance to the artificial satellite 40 when seen from the unmanned aerial vehicle 30.

Next, the controller 19 calculates the position of the unmanned aerial vehicle 30 on the basis of the bearing and distance obtained in step T3 and the absolute position of the artificial satellite 40 (step T4).

Specifically, the controller 19 first calculates the absolute position (coordinates) of the artificial satellite 40 by using the satellite orbit information 180, and calculates the position of the unmanned aerial vehicle 30, the position being a position indicated by the coordinates of an inverse vector for the bearing and distance obtained in step T3, from the absolute position. The calculated position is used to correct the inertial-navigation-based position to be output from the inertial navigation device 15.

Accordingly, even in the case where the reliability of own-position measurement performed by the inertial navigation device 15 is compromised because, for example, the GPS receiver 14 suffers from jamming or spoofing by a false signal, the position of the unmanned aerial vehicle 30 can be satisfactorily measured. Specifically, the position can be satisfactorily measured during flight at a high altitude at which almost no clouds that block laser light are present (for example, at an altitude of 15 km (50000 ft.) or higher, which is an altitude higher than an altitude at which high clouds gather).

Next, the controller 19 determines whether to end the position measurement (step T5). In a case where it is determined that the position measurement is not to be ended (No in step T5), the flow returns to step T1 described above.

On the other hand, in a case where it is determined that the position measurement is to be ended because, for example, the unmanned aerial vehicle 30 arrives at the destination (Yes in step T5), the controller 19 ends the position measurement.

As described above, according to the second embodiment, as in the first embodiment described above, laser light emitted from the laser distance-angle measuring device 13 on the unmanned aerial vehicle 30 is reflected by the reflector 21 of the artificial satellite 40 in the direction in which the laser light arrives so that the bearing and distance to the artificial satellite 40 when seen from the unmanned aerial vehicle 30 are measured. On the basis of the measured bearing and distance to the artificial satellite 40 and the absolute position of the artificial satellite 40, the position of the unmanned aerial vehicle 30 is calculated.

Accordingly, unlike in the existing celestial navigation that involves a heavy computational load and limited daytime use, the position of the unmanned aerial vehicle 30 can be satisfactorily measured without depending on external signals. As a consequence, even in the case where the GPS receiver 14 suffers from jamming or spoofing, own-position measurement can be performed with a higher accuracy than in the case where only the inertial navigation device 15 is used.

Further, the scattered light from the scattering plate 41 on the artificial satellite 40 is captured by the optical sensor 31 on the unmanned aerial vehicle 30, and the bearing to the artificial satellite 40 when seen from the unmanned aerial vehicle 30, the bearing being the direction of the scattered light, is estimated. Then, laser light for measurement is emitted from the laser distance-angle measuring device 13 toward a predetermined range including the estimated bearing.

Therefore, as in the first embodiment described above, the bearing and distance to the artificial satellite 40 can be efficiently measured while the range to which laser light is emitted from the laser distance-angle measuring device 13 is limited.

Further, the bearing to the artificial satellite 40 can be obtained without using the inertial navigation device 15, that is, without depending on the accuracy of the inertial-navigation-based position.

Further, sunlight is scattered by the scattering plate 41 on the artificial satellite 40, and therefore, a light source only for emitting scattered light from the artificial satellite 40 need not be provided.

Modifications

Examples of the disclosure are not limited to the above-described two embodiments, and modifications can be made as appropriate without departing from the spirit of the disclosure.

Figure 7A:
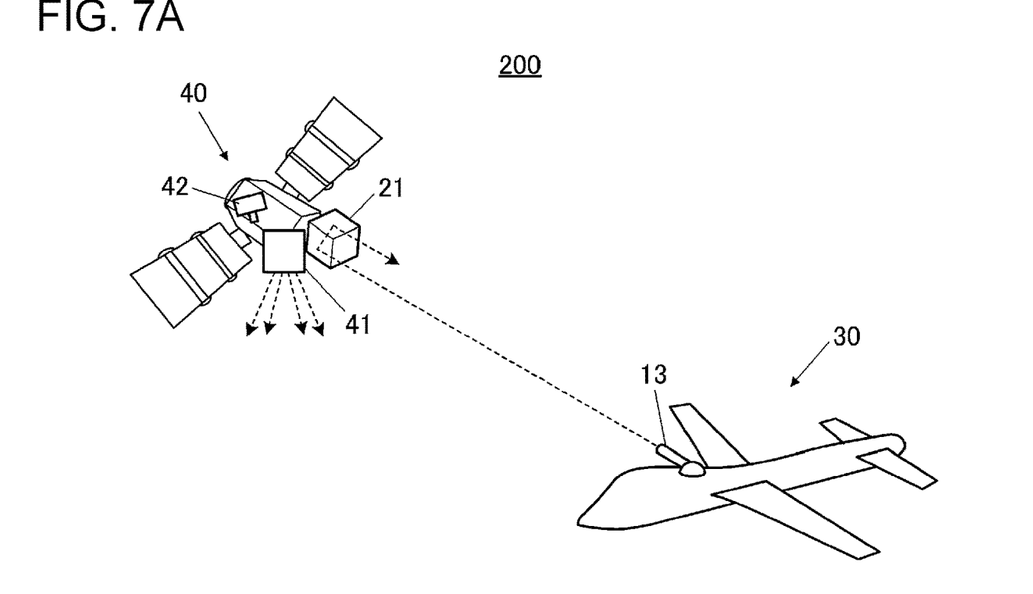
FIG. 7A and FIG. 7B are schematic diagrams illustrating modifications of the position measurement system in the second embodiment.

For example, in the second embodiment described above, sunlight is reflected by the scattering plate 41 on the artificial satellite 40; however, as illustrated in FIG. 7A, a laser light source 42 may be mounted on the artificial satellite 40, and laser light from the laser light source 42 may be scattered by the scattering plate 41.

Figure 7B:
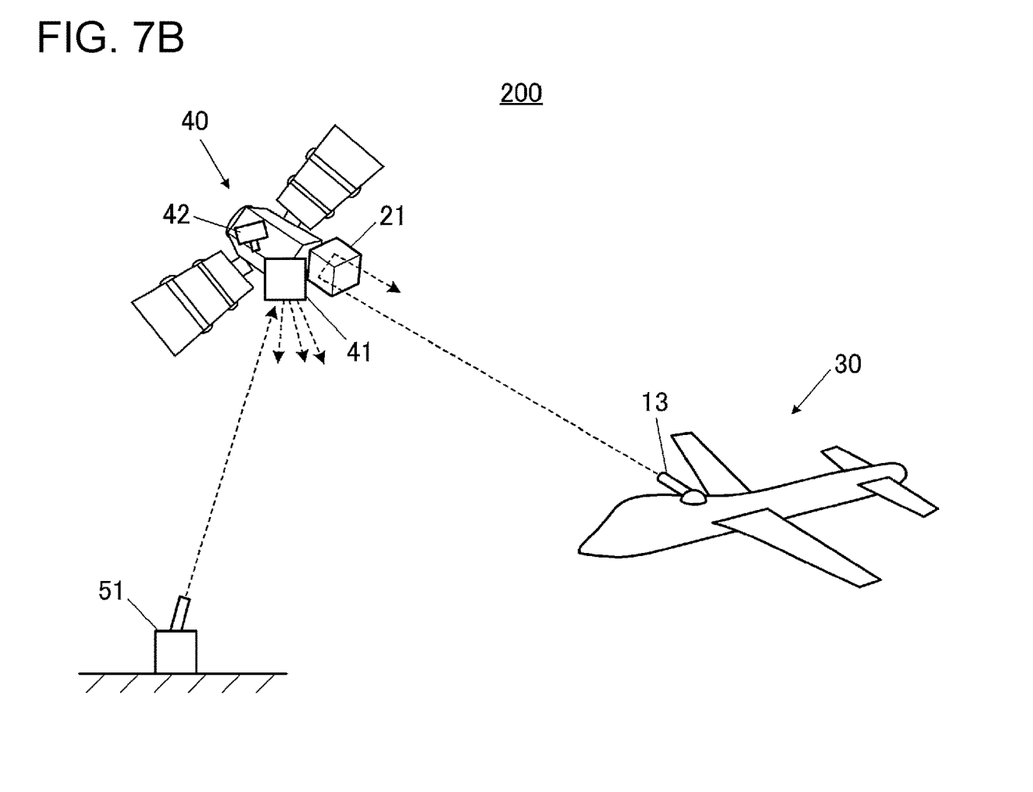

Alternatively, as illustrated in FIG. 7B, a laser light source 51 may be placed at a known position on the ground, and laser light from the laser light source 51 may be scattered by the scattering plate 41 on the artificial satellite 40.

As described above, when a laser light source provided on the artificial satellite 40 or at a known position on the ground is used, even in a case where the artificial satellite 40 does not receive sunlight in, for example, the nighttime, light is scattered by the scattering plate 41 so that the bearing to the artificial satellite 40 can be obtained.

In this case, a modulator (not illustrated) that modulates laser light from the laser light source may be provided on the artificial satellite 40 or on the ground. With this, laser light to be scattered by the scattering plate 41 on the artificial satellite 40 can be modulated, and therefore, the laser light can be used as a carrier (a carrier wave) to transmit information (for example, a signal for identifying the artificial satellite 40, information about orbital fluctuation or deviation, and so on). Accordingly, information can be transmitted from the artificial satellite 40 or the ground to the unmanned aerial vehicle 30 without using a radio wave.

In the first and second embodiments described above, the bearing and distance to the artificial satellite are measured by the laser distance-angle measuring device 13 using laser light; however, an electromagnetic wave may be emitted to perform measurement in a similar manner. Note that, as described above, it is desirable to use laser light having high directivity.

Further, instead of the laser distance-angle measuring device 13, a radar may be mounted on the unmanned aerial vehicle and used to measure the bearing and distance to the artificial satellite. Also in this case, the radar uses a high-power radio wave within a directivity range, and therefore, it is possible to reduce the likelihood of interference as in the case of using laser light.

The aircraft according to an embodiment of the disclosure is not limited to the unmanned aerial vehicle (unmanned aircraft) and may be a manned aircraft.

The invention claimed is:

1. An aircraft position measurement system for an aircraft configured to use an artificial satellite configured to fly in a known orbit, the aircraft position measurement system comprising:
   a laser emitter mounted on the aircraft, the laser emitter configured to emit an electromagnetic wave;
   a reflector configured to be mounted on the artificial satellite and reflect the electromagnetic wave emitted by the laser emitter in a direction in which the electromagnetic wave arrives;
   a photoreceptor mounted on the aircraft, the photoreceptor configured to receive the electromagnetic wave reflected by the reflector;
   an inertial navigation device configured to be mounted on the aircraft and obtain an inertial-navigation-based position of the aircraft; and
   a controller mounted on the aircraft configured to:
      obtain an absolute position of the artificial satellite;
      estimate a distance from the aircraft to the artificial satellite based on the electromagnetic wave received by the photoreceptor;
      estimate a bearing to the artificial satellite when seen from the aircraft on a basis of the inertial-navigation-based position of the aircraft and the absolute position of the artificial satellite; and
      calculate a position of the aircraft on a basis of the absolute position and the bearing and the distance to the artificial satellite,
   wherein the laser emitter is configured to emit the electromagnetic wave for measurement to a predetermined range including the bearing estimated by the controller.

2. The aircraft position measurement system according to claim 1, further comprising:
   a scattering plate configured to be mounted on the artificial satellite and scatter light;
   an optical sensor configured to be mounted on the aircraft and capture scattered light from the scattering plate; and
   wherein the controller is configured to estimate the bearing to the artificial satellite when seen from the aircraft, the bearing being a direction of the scattered light captured by the optical sensor,
   wherein the laser emitter is configured to emit the electromagnetic wave for measurement to a predetermined range including the bearing estimated by the controller.

3. The aircraft position measurement system according to claim 2, wherein the scattering plate is configured to scatter sunlight.

4. The aircraft position measurement system according to claim 3, further comprising
   a laser light source configured to be disposed on the artificial satellite or at a known position on ground, wherein
   the scattering plate is configured to scatter laser light from the laser light source.

5. The aircraft position measurement system according to claim 4, further comprising
   a modulator configured to modulate the laser light from the laser light source.

6. The aircraft position measurement system according to claim 2, further comprising
   a laser light source configured to be disposed on the artificial satellite or at a known position on ground, wherein
   the scattering plate is configured to scatter laser light from the laser light source.

7. The aircraft position measurement system according to claim 6, further comprising
   a modulator configured to modulate the laser light from the laser light source.

8. The aircraft position measurement system according to claim 1, wherein
   the laser emitter is configured to emit laser light as the electromagnetic wave, or a radar.

9. The aircraft position measurement system according to claim 1, wherein
   the aircraft is configured to fly at a high altitude at which almost no cloud is present.

10. The aircraft position measurement system according to claim 1, wherein the aircraft is an unmanned aircraft.

11. The aircraft position measurement system according to claim 1, wherein the aircraft is an unmanned aircraft.

12. An aircraft position measurement method for measuring a position of an aircraft by using an artificial satellite configured to fly in a known orbit, wherein
   a reflector is to be mounted on the artificial satellite, the reflector being configured to reflect an electromagnetic wave emitted from the aircraft;
   an inertial navigation device configured to be mounted on the aircraft and obtain an inertial-navigation-based position of the aircraft;
   and
   a controller of the aircraft is configured to perform the method comprising:
      emitting the electromagnetic wave from the aircraft;
      receiving the electromagnetic wave reflected by the reflector,
      measuring a distance to the artificial satellite based on the electromagnetic wave reflected by the reflector;
      obtaining an absolute position of the artificial satellite;
      estimating a bearing to the artificial satellite when seen from the aircraft on a basis of the inertial-navigation-based position of the aircraft and the absolute position of the artificial satellite;
   and
      calculating the position of the aircraft on the basis of the absolute position of the artificial satellite and the bearing and distance to the artificial satellite,
   wherein the electromagnetic wave is emitted from the aircraft for measurement to a predetermined range including the bearing estimated by the controller.

13. An aircraft comprising:
   a controller configured to obtain an absolute position of an artificial satellite;
   an inertial navigation device configured to be mounted on the aircraft and obtain an inertial-navigation-based position of the aircraft;
   a laser emitter configured to emit an electromagnetic wave, wherein the artificial satellite reflects the electromagnetic wave;

wherein the controller is configured to:
  measure a distance from the aircraft to the artificial satellite based on the electromagnetic wave reflected by the artificial satellite,
  estimate a bearing to the artificial satellite when seen from the aircraft on a basis of the inertial-navigation-based position of the aircraft and the absolute position of the artificial satellite; and
  calculate a position of the aircraft on a basis of the absolute position of the artificial satellite and the bearing and the distance to the artificial satellite,
wherein the laser emitter is configured to emit the electromagnetic wave for measurement to a predetermined range including the bearing estimated by the controller.

* * * * *